US007286843B2

(12) United States Patent
Scheck (10) Patent No.: US 7,286,843 B2
(45) Date of Patent: Oct. 23, 2007

(54) IDENTIFYING REMOTE RADIO UNITS IN A COMMUNICATION SYSTEM

(75) Inventor: Hans-Otto Scheck, Espoo (FI)

(73) Assignee: Nokia Corporation, Espoo (FI)

( * ) Notice: Subject to any disclaimer, the term of this patent is extended or adjusted under 35 U.S.C. 154(b) by 699 days.

(21) Appl. No.: 10/845,358

(22) Filed: May 14, 2004

(65) Prior Publication Data

US 2005/0181812 A1 Aug. 18, 2005

(30) Foreign Application Priority Data

Feb. 12, 2004 (FI) .................................. 20040220

(51) Int. Cl.
*H04Q 7/20* (2006.01)
(52) U.S. Cl. ................. 455/507; 455/500; 455/422.1; 455/426.1; 455/426.2; 455/562.1; 455/232.1; 455/355; 370/338; 370/339; 370/241; 370/242; 370/243; 370/246
(58) Field of Classification Search ............ 455/422.1, 455/426.1, 426.2, 414.1, 500, 507, 88, 67.11, 455/67.14, 561, 562.1, 132, 143, 227, 232.1, 455/234.1, 245.1, 352, 355; 370/338, 339, 370/241, 242, 243, 246
See application file for complete search history.

(56) References Cited

U.S. PATENT DOCUMENTS 5,657,374 A * 8/1997 Russell et al. .............. 370/328

7,039,399 B2 * 5/2006 Fischer .................... 455/422.1

FOREIGN PATENT DOCUMENTS

JP 2002217844 * 8/2002

* cited by examiner

*Primary Examiner*—Matthew Anderson
*Assistant Examiner*—Sujatha Sharma
(74) *Attorney, Agent, or Firm*—Squire, Sanders & Dempsey, L.L.P.

(57) ABSTRACT

A method for identifying a remote radio unit in a communication system comprises a plurality of remote radio units communicating with a central unit and pattern providing means for providing information about dedicated gain change patterns of the remote radio units. The method comprises receiving a signal from a station by a remote radio unit of the plurality of remote radio units. The method also includes changing the gain of at least one remote radio unit according to a dedicated gain change pattern of the at least one remote radio unit. The method also includes detecting a gain change pattern for the received signal and identifying the remote radio unit by comparing the detected gain change pattern with information about dedicated gain change patterns of the remote radio units provided by the pattern providing means. An example may be locating a station, such as a user equipment, in a distributed radio system.

24 Claims, 5 Drawing Sheets

IDENTIFYING REMOTE RADIO UNITS IN A COMMUNICATION SYSTEM

FIELD OF THE INVENTION

The invention relates to communication systems, and more particularly to identifying remote radio units in a communication system, such as a distributed communication system.

BACKGROUND OF THE INVENTION

Mobile communication systems allow mobility for users thereof. A mobile communication system may be provided by a cellular or otherwise wireless communication system using radio frequencies for sending voice or data between stations, such as user equipment (UE) (e.g. mobile stations, MS) and base transceiver stations (BTS), also called base stations. A base station system commonly comprises an antenna connected with appropriate electronics and control devices and so on. The radio frequencies may be divided in channels including traffic channels for voice and data transfer and signal channels for transferring control signals for the purposes of setting up a call or controlling an ongoing connection. Examples of cellular mobile communication systems include standards such as the GSM (Global System for Mobile communication) or various GSM based systems, such as GPRS (General Packet Radio Service), third generation standards, such as the UMTS (Universal Mobile Telecommunication System) and other communication systems that are based on the Wideband Code Division Multiple Access (WCDMA). In addition, local systems may be used to provide mobility. For example, a user may be provided wireless communications by means of systems that are based on any appropriate wireless local area network (WLAN) standards. A mobile user may access the mobile network, for example, by means of a user equipment, such as a personal computer (PC), personal digital assistant (PDA), mobile station (MS) and so on.

Various services can be provided for a user of a mobile user equipment by means of a communication system. Recent development in the field of mobile user equipment has lead to arrangements wherein information about the location of a mobile user equipment is determined and utilized when providing services for the user equipment or other parties. Such services are sometimes called location sensitive services. Location information may be used for various purposes, such as for location of a mobile telephone that has made an emergency call, for locating vehicles or mobile subscribers for commercial purposes and so on.

Information about the location of a mobile user equipment may be defined relative to the location of the base station. This is based on the assumption that a user equipment in communication with a base station must be located within the coverage area of that base station. The geographical location of the base station is commonly known, and therefore it is possible to conclude the location of the user equipment based on the identity of the base station.

Location based services are expected to become very important in relation to future mobile communication systems. As such, the need to accurately determine the position of mobile user equipment may increase and be based on commercial and security aspects.

A base station system having a plurality of remote radio units for transmitting and receiving at least one carrier signal has also been proposed. Such distributed radio units are referred to in the following as remote radio units, but may as well be called as remote heads, radio units, remote units and radio heads, or the like. Non-limiting examples of such distributed systems include an advanced indoor radio (AIR) and a distributed antenna system (DAS). For example, distributed wideband code division multiple access (WCDMA) technique may be used in channel multiplexing in such a distributed system. Signals transmitted from the remote radio units may not include an identification of the remote radio unit, but only an identification of the associated base station. Therefore, it may not be possible to determine from which of the remote radio units a signal has been received and thus which remote radio unit is closest to the mobile user. As a base station provided with remote radio units may cover a large area, the accuracy of the location information obtainable for a user equipment relative to the base station may in certain cases be insufficient, for example for commercial or emergency needs.

The accuracy of the location services may be improved by various manners from that of one cell. For example, location services may employ information of measurements regarding time of arrival, signal strength and so on. However, even with these it may be important to be able to tell precisely the radio unit which received signals from the target mobile user equipment.

Therefore, there is a need for improved system for identifying the remote radio unit closest to a mobile unit. It may be desired to achieve increased location accuracy for example inside a building, in particular when distributed base station systems are concerned.

SUMMARY OF THE INVENTION

Embodiments of the invention aim to address one or several of the above problems or issues.

In accordance with an aspect of the invention, there is provided a method for identifying a remote radio unit in a communication system comprising a plurality of remote radio units communicating with a central unit and pattern providing means for providing information about dedicated gain change patterns of the remote radio units. The method comprises receiving from a station a signal by a remote radio unit of the plurality of remote radio units, changing the gain of at least one remote radio unit according to a dedicated gain change pattern of said at least one remote radio unit, detecting a gain change pattern for the received signal and identifying the remote radio unit by comparing the detected gain change pattern with information about the dedicated gain change patterns of the remote radio units provided by the pattern providing means.

In accordance with another aspect of the invention, there is provided a method for locating a station in a communication system comprising a plurality of remote radio units communicating with a central unit, the method comprising identifying the remote radio unit receiving the signal from the station using the method as defined above.

In accordance with another aspect of the invention, there is provided a method for locating a user equipment in a communication system comprising a plurality of remote radio units communicating with a central unit, the method comprising receiving from the user equipment a signal by at least one remote radio unit of the plurality of remote radio units, changing the gain of the at least one remote radio unit according to a dedicated gain change pattern of said at least one remote radio unit, detecting a gain change pattern for the received signal, identifying the at least one remote radio unit by comparing the detected gain change pattern with information about the dedicated gain change patterns of the remote radio units provided by the pattern providing means; and identifying the remote radio unit closest to the user equipment from the at least one remote radio unit. The identifying remote radio unit closest to the user equipment may comprise identifying the remote radio unit from where the signal is received with the shortest delay to be closest to the user.

In accordance with another aspect of the invention, there is provided a communication system comprising a plurality of remote radio units communicating with a central unit, pattern providing means for providing information about dedicated gain change patterns of the remote radio units, receiving means, in the remote radio units, for receiving a signal from a station, changing means for changing the gain of at least one remote radio unit according to a dedicated gain change pattern of said at least one remote radio unit, detecting means for detecting a gain change pattern for the received signal and identifying means identifying the remote radio unit by comparing the detected gain change pattern with information about dedicated gain change patterns of the remote radio units provided by the pattern providing means.

In accordance with another aspect of the invention, there is provided a central unit for a communication system comprising a plurality of remote radio units communicating with the central unit, the central unit being configured to identify the remote radio unit receiving a signal from a station sending the signal by comparing a detected gain change pattern with information about dedicated gain change patterns of the remote radio units.

In accordance with another aspect of the invention, there is provided a remote radio unit for a communication system comprising a plurality of remote radio units communicating with a central unit, the remote radio unit being configured to receive a signal from a station, enable changing a gain of the remote radio unit according to a dedicated gain change pattern of the remote radio unit and provide information of the received signal having the gain changed by changing means, the information being provided with the central unit for identifying the remote radio unit by comparing the detected gain change pattern of the received signal having the gain changed by changing means with information about dedicated gain change patterns of the remote radio units.

In accordance with another aspect of the invention, there is provided an arrangement for a communication system comprising a plurality of remote radio units communicating with a central unit and pattern providing means for providing information about dedicated gain change patterns of the remote radio units, the arrangement being configured to receive from a station a signal by a remote radio unit of the plurality of remote radio units, change the gain of at least one remote radio unit according to a dedicated gain change pattern of said at least one remote radio unit, detect a gain change pattern for the received signal and identify the remote radio unit by comparing the detected gain change pattern with information about the dedicated gain change patterns of the remote radio units provided by the pattern providing means.

BRIEF DESCRIPTION OF THE FIGURES

The invention will now be described in further detail, by way of example only, with reference to the following examples and accompanying drawings, in which.

DESCRIPTION OF THE PREFERRED EMBODIMENTS

Some preferred embodiments of the invention are described in the following. It is to be noted that the invention is not limited to these exemplifying embodiments.

Figure 1:
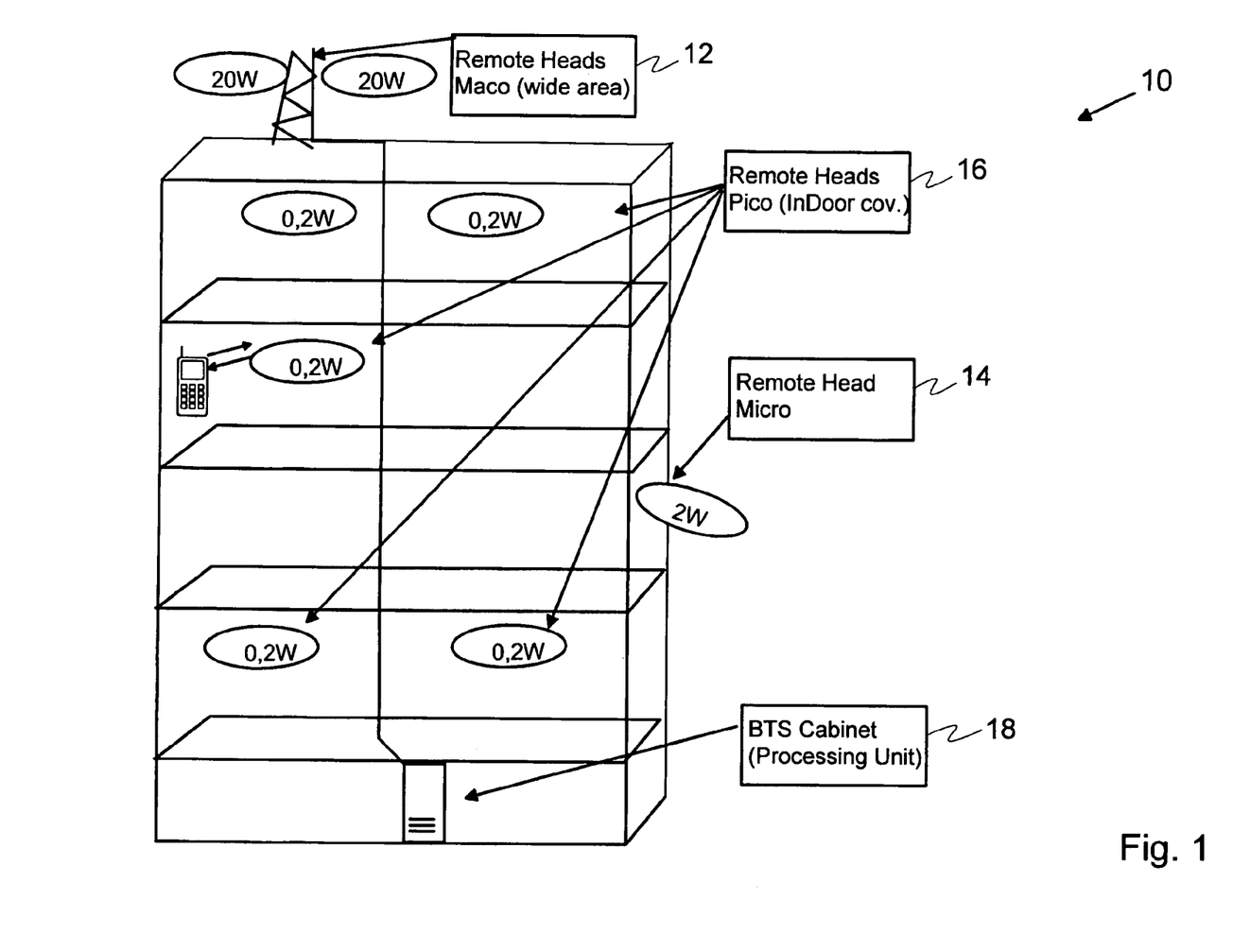
FIG. 1 shows an example of a distributed base station concept in which embodiments of the invention may be implemented.

FIG. 1 shows an example of a distributed base station system 10 provided in a building. Multiple remote radio units 12, 14, 16, such as transceivers (TRXs), other radio units or distributed antenna system, are combined to one single base station and connected to a common base station processor unit 18 in a base station cabinet. As an example, the remote radio units in a distributed base station system may include relatively powerful wide area coverage heads (Maco) 12, less powerful micro heads 14 and low power indoor coverage heads (Pico) 16. User equipment 20 is shown to be connected with the base station system 10 over a wireless interface, such as a radio path.

Using prior art systems described above, the location of a user could be determined as being somewhere in or in the proximity of the building. Embodiments of the invention aim to provide means for accurately locating the user equipment in a specific floor or even in a specific room of the building.

In a base station, in particular in the receiver of a base station, gain control, such as automatic gain control (AGC), is typically used to maintain amplifier gain, i.e. output power level, within a given power range. The input power level of the amplifier may vary within a given range and without gain control the signal may be clipped in the amplifier or in a subsequent analog-to-digital converter when the amplifier receives a signal with too high power level. Clipping may cause signal distortion.

In the exemplifying embodiments of invention, the gain control of each remote radio unit in a distributed base station system is used to identify which unit receives the strongest signal. This may be achieved by applying a dedicated gain pattern to each remote radio unit or, alternatively, by successively modifying the gain of each remote radio unit.

Figure 2:
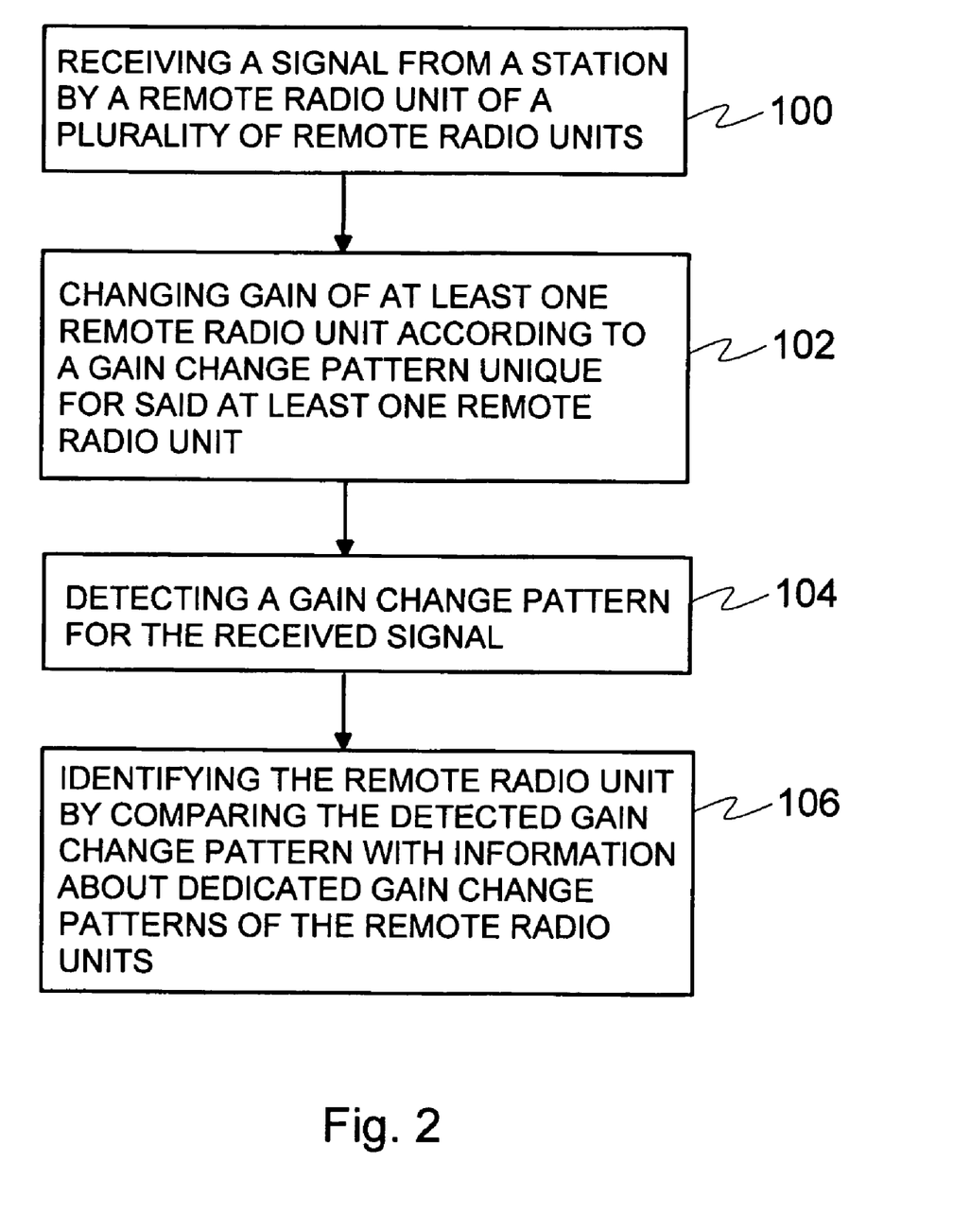
FIG. 2 is a flow chart illustrating an embodiment of the invention.

FIG. 2 shows a flow chart illustrating an embodiment of the invention in a communication system comprising a plurality of remote radio units communicating with a central unit, such as the communication system shown in FIG. 1. At least one of the remote radio units, receives a signal from a station, such as a user equipment 20, at step 100. At step 102 the gain of at least one remote radio unit is changed according to a dedicated gain change pattern unique for said at least one remote radio unit. The processing unit 18 monitors for a gain change pattern for the outputs of the remote radio units at step 104 to detect a gain change pattern for the received signal. The particular remote radio unit may then be identified at step 106 by comparing the detected gain change pattern with information about the dedicated gain change patterns of the remote radio units provided by pattern providing means, for example stored in a memory of the processing unit or in a shift memory.

The pattern providing means may also comprise a part in the remote radio unit providing information for changing the gain locally in the remote radio unit. Another part of the pattern providing means may then be comprised in the central unit for providing information of the dedicated gain change patterns for the purposes of identifying the remote radio unit.

The gain control is typically used to optimize the dynamic range of the remote radio unit to the existing conditions. Only rarely the remote radio unit operates on the limits of its range. Normally, a gain change of 1-3 dB can be caused without noticeable effect to the total radio unit performance.

The gain of each remote radio unit may be changed continuously according to a dedicated random pattern assigned to and unique for each remote radio unit.

Figure 3:
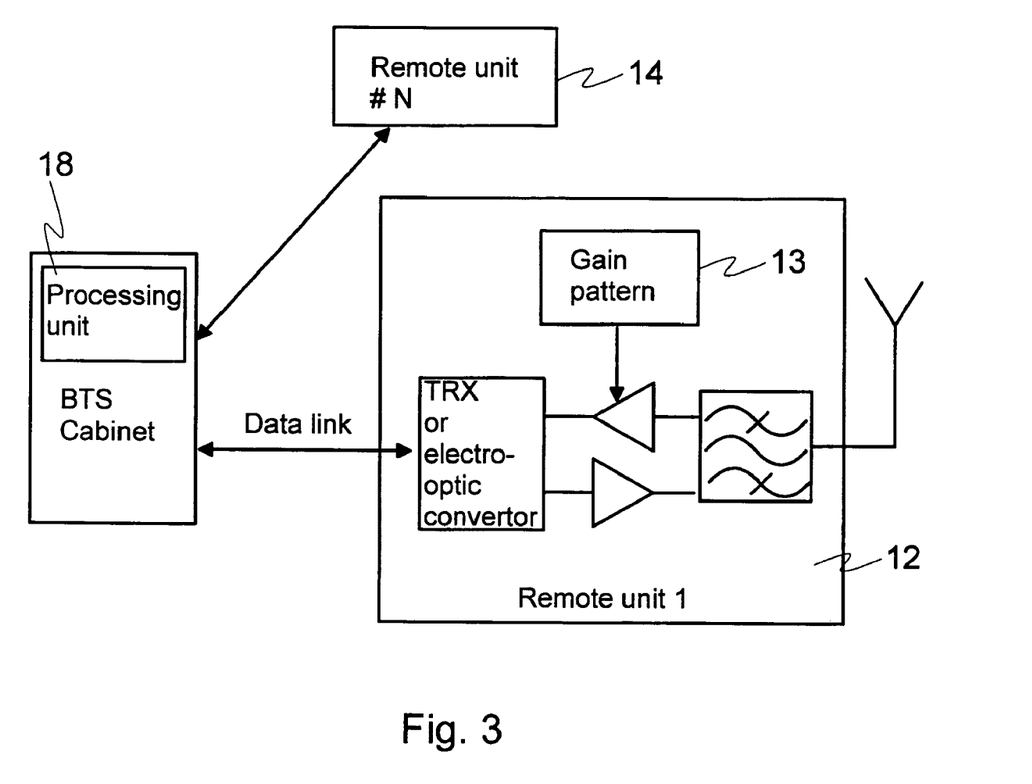
FIG. 3 shows an arrangement in accordance with an embodiment of the invention.

In an embodiment shown in FIG. 3, a gain change pattern may be generated by a local gain pattern generator 13 within or connected to a remote radio unit 12, the gain change pattern being dedicated to the remote radio unit. The local gain pattern generator 13 is configured to change the gain of the remote radio unit even without any control of the central unit, such as a processing unit 18. The gain change pattern may have a random form or may follow a predetermined algorithm. The processing unit 18 of the distributed base station system 10 may correlate slow gain steps of the remote radio unit with the signal strength and identify the remote radio unit based on the unique code of the remote radio unit. The remote radio unit 12 may modify its gain in a determined manner so that the processing unit 18 of the base station system is able to monitor whether the signal strength measurements carried out by the base station system behave in the corresponding manner. If there is a match in the behavior, it can be concluded that the strongest signal is coming from the remote radio unit 12 in question, i.e. the mobile user equipment is served by that remote radio unit 12.

The above embodiment may be used when the distributed base station system does not have an independent gain control for each remote radio unit, for example if the remote radio units have fixed gain settings. This embodiment may also be used even when the distributed base station system has an independent gain control for each remote radio unit.

Figure 4:
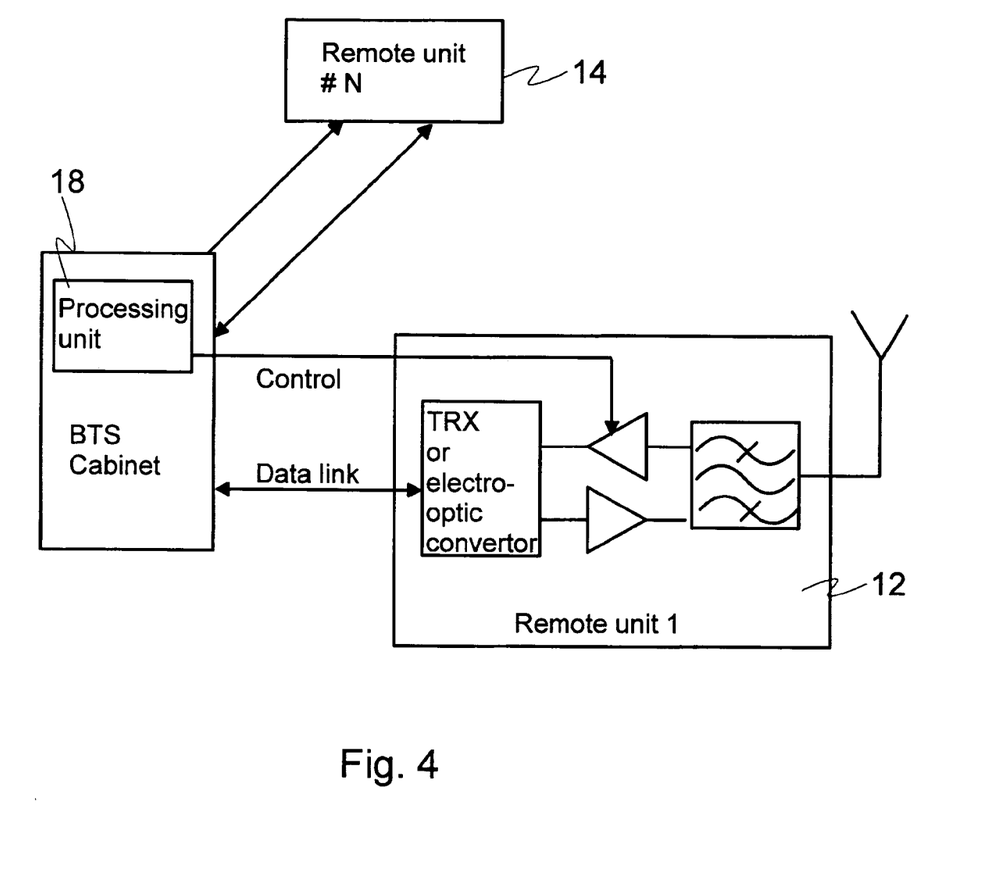
FIG. 4 shows an arrangement in accordance with another embodiment of the invention.

In another embodiment illustrated in FIG. 4, the gain change pattern is generated and assigned by the processing unit 18. In this embodiment, the gain value of a first remote radio unit 12 is switched according to a pseudo random gain pattern and a value reflecting the signal strength, such as a signal to interference ratio (SIR) or a radio signal strength indicator (RSSI), of a mobile user equipment received in the first remote radio unit 12 is measured. Then, the processing unit 18 of the base station cabinet determines if the signal strength variance correlates with the gain steps. This correlation process is in principle the same as above, with the exception that the sequence used for gain control is produced in a central unit, such as the processing unit 18, and can be reused for the correlation process. This embodiment may be advantageous when the distributed base station system has an independent gain control for each remote radio unit.

The gain stepping is then repeated sequentially at the other remote radio units 14, until the remote radio unit with the strongest signal to the mobile user equipment can be identified.

The identification of the closest remote radio unit is based on correlation of the gain change pattern over time. The timing of the measurements is normally not a critical aspect, as in many cases a user equipment is moved relatively slowly inside buildings. Therefore, the gain change pattern may be monitored over a period of time, preferably over several seconds. This way, differences in the measured radio signal strengths from a measurement to another, caused by possible measurement errors, fast and slow fading, obstacles and so on, may be compensated and the identification code may be recognized.

The generation of (pseudo) random bit patterns may be carried out in any appropriate manner. A simple method for generating a maximum sequence bit pattern is a shift register of N-bit length with a small number of selection parameters to set the feedback taps and starting conditions.

Figure 5:
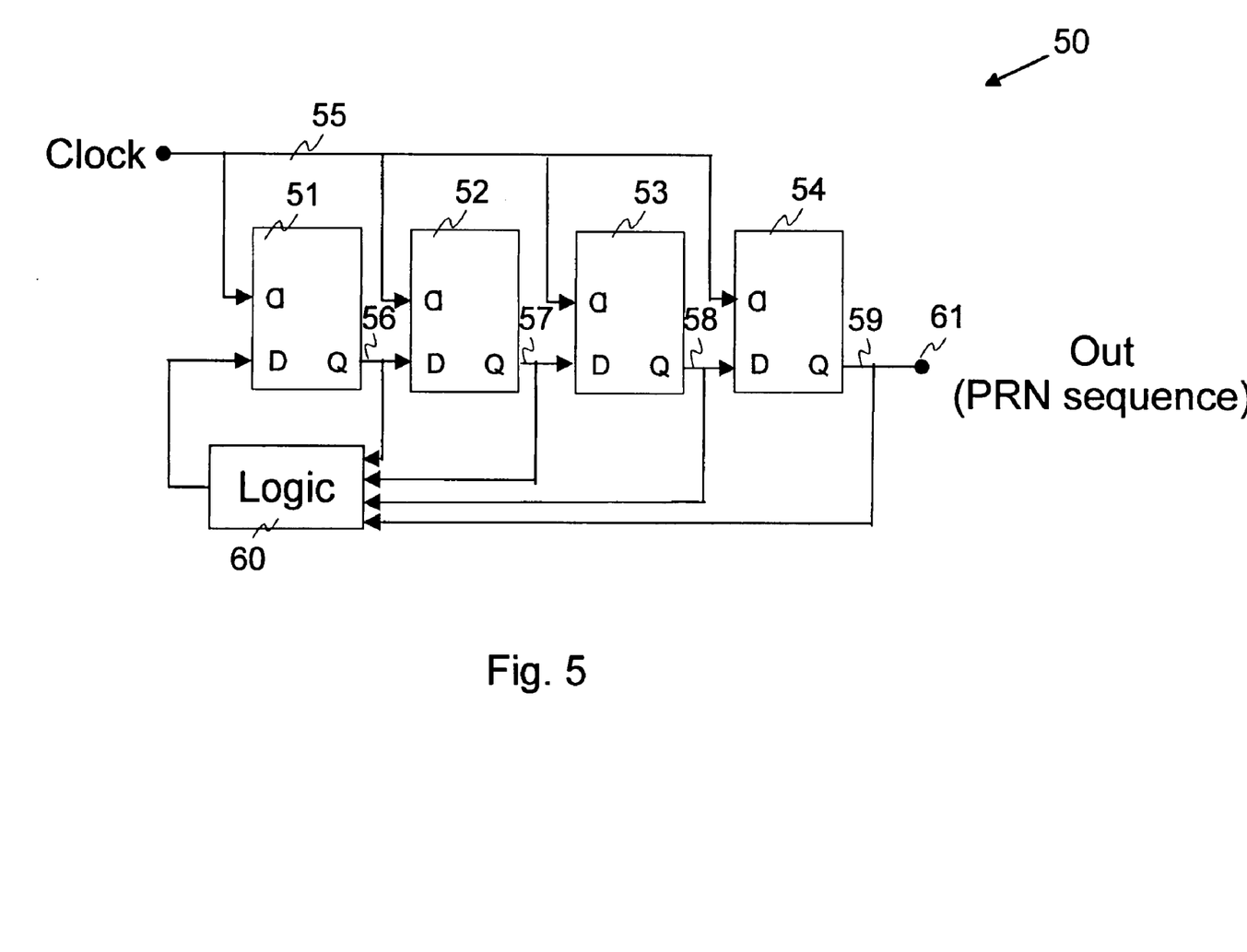
FIG. 5 shows an exemplifying pattern generator.

FIG. 5 shows an exemplifying simple pattern generator. In the example shown, the pattern generator 50 consists of four storage cells 51, 52, 53, 54 (D-flip-flop), which are clocked by a common clock signal 55. The output 56 of the first cell 51 feeds into the following cell 52. All outputs 56, 57, 58, 59 are combined within the logic box 60, which feeds back to the first cell 51. The connections within the logic box create an output function of the four flip-flop outputs. This determines the bit pattern at the output 61. The maximum sequence length of such a pseudo random (PRN) pattern is $p=2^n-1$ (n=number of flip-flops). Different sequences can be created with different logical connections.

In a static environment, a simple gain change monitor might be used to identify the corresponding remote radio unit. In general mobile systems and particularly in CDMA systems were the signal strength continuously changes and a fast power control loop will attempt to compensate the signal strength changes, correlation techniques have to be applied which do not track the absolute gain changes but determine the correlation of either the sequence of the signal strength change or power control sequence with the gain control pattern.

The corresponding variance with a particular pseudo random gain pattern can be detected in a central unit, such as the processing unit 18, with standard correlation techniques as used for example in CDMA systems. Simplified methods might be used, as the time delay between the remote radio unit and the central unit is fixed.

In case two or more remote radio units are simultaneously receiving a signal from a single user equipment, the paths may be separated due to the unique gain change pattern of each remote radio unit. The remote radio unit receiving the signal with the shortest delay is assumed to be closest to the user.

If several remote radio units have strong signal components from a single mobile user equipment, triangulation based on the signal strength and time delay or other appropriate method can be applied to further increase the location accuracy.

Although the invention has been described in the context of particular embodiments, there are several variations and modifications which may be made to the disclosed solution without departing from the scope of the present invention as defined in the appended claims. For example, embodiments may be implemented in radio over fiber systems or distributed antenna systems.

The invention claimed is:

1. A method for identifying a remote radio unit in a communication system comprising a plurality of remote radio units communicating with a central unit and pattern providing means for providing information about dedicated gain change patterns of the plurality of remote radio units, the method comprising:
   receiving from a station a signal by a remote radio unit of a plurality of remote radio units;
   changing a gain of at least one remote radio unit according to a dedicated gain change pattern of said at least one remote radio unit;

detecting a gain change pattern for the received signal; and identifying the remote radio unit by comparing the detected gain change pattern with information about dedicated gain change patterns of the plurality of remote radio units provided by a pattern providing means.

2. A method according to claim 1, wherein the identifying step comprises identifying the remote radio unit based on a particular signal strength pattern of said remote radio unit.

3. A method according to claim 1, wherein the identifying step comprises identifying the remote radio unit based on a particular power control sequence of said remote radio unit.

4. A method according to claim 1, wherein the changing step comprises changing the gain of the at least one remote radio unit using a dedicated gain change pattern stored in said remote radio unit.

5. A method according to claim 1, wherein the changing step comprises changing the gain of the at least one remote radio unit using a dedicated gain change pattern stored in the central unit and provided to said remote radio unit.

6. A method according to claim 1, wherein the detecting step comprises detecting in a central unit whether measurements carried out in the central unit give results behaving in a corresponding manner as a dedicated change pattern of a particular remote radio unit provided by the pattern providing means and, if there is a match in the behavior, the method further comprises identifying said particular remote radio unit as the remote radio unit serving the station.

7. A method according to claim 1, wherein providing by the pattern providing means comprises providing the dedicated gain change patterns of the plurality of remote radio units stored in a memory.

8. A method according to claim 1, wherein providing by the pattern providing means comprises providing the dedicated gain change patterns of the plurality of remote radio units stored in a shift register.

9. A method according to claim 1, further comprising generating a maximum sequence bit pattern as the gain change pattern by using a shift register of N-bit length with a small number of selection parameters to set feedback taps and starting conditions.

10. A method according to claim 1, wherein the detection step comprises using a gain change monitor.

11. A method according to claim 1, wherein the identifying step comprises determining a correlation of the gain change pattern over time.

12. A method for locating a station in a communication system comprising a plurality of remote radio units communicating with a central unit, the method comprising:

identifying a remote radio unit receiving a signal from a station by:

receiving from a station a signal by a remote radio unit of a plurality of remote radio units;

changing a gain of at least one remote radio unit according to a dedicated gain change pattern of said at least one remote radio unit;

detecting a gain change pattern for the received signal; and identifying the remote radio unit by comparing the detected gain change pattern with information about dedicated gain change patterns of the plurality of remote radio units provided by a pattern providing means.

13. A method for locating a user equipment in a communication system comprising a plurality of remote radio units communicating with a central unit, the method comprising:

receiving a signal from a user equipment by at least one remote radio unit of a plurality of remote radio units;

changing a gain of the at least one remote radio unit according to a dedicated gain change pattern of said at least one remote radio unit;

detecting a gain change pattern for the received signal;

identifying the at least one remote radio unit by comparing the detected gain change pattern with information about dedicated gain change patterns of the plurality of remote radio units provided by a pattern providing means; and identifying a remote radio unit closest to the user equipment from the at least one remote radio unit.

14. A method according to claim 13, wherein identifying the remote radio unit closest to the user equipment comprises identifying the remote radio unit from where the signal is received with a shortest delay to be closest to a user.

15. A communication system comprising:

a plurality of remote radio units communicating with a central unit;

pattern providing means for providing information about dedicated gain change patterns of the plurality of remote radio units;

receiving means for receiving a signal from a station in the plurality of remote radio units;

changing means for changing a gain of at least one remote radio unit according to a dedicated gain change pattern of said at least one remote radio unit;

detecting means for detecting a gain change pattern for the received signal; and identifying means identifying a remote radio unit by comparing the detected gain change pattern with information about dedicated gain change patterns of the plurality of remote radio units provided by the pattern providing means.

16. A communication system according to claim 15, wherein the pattern providing means is located in each of the plurality of remote radio units.

17. A communication system according to claim 15, wherein the pattern providing means is located in the central unit.

18. A communication system according to claim 15, wherein the pattern providing means comprises one of a memory and a shift register.

19. A central unit for a communication system comprising a plurality of remote radio units communicating with the central unit, the central unit configured to identify a remote radio unit receiving a signal from a station sending the signal by comparing a detected gain change pattern with information about dedicated gain change patterns of the plurality of remote radio units.

20. A central unit according to claim 19, further configured to provide information about the dedicated gain change patterns of the plurality of remote radio units.

21. A central unit according to claim 19, further configured to change a gain of at least one remote radio unit according to a dedicated gain change pattern of said at least one remote radio unit.

22. A remote radio unit for a communication system comprising a plurality of remote radio units communicating with a central unit, the remote radio unit configured to:

receive a signal from a station;

enable changing a gain of a remote radio unit according to a dedicated gain change pattern of the remote radio unit; and provide information of the received signal having the gain changed by changing means, the information provided with a central unit for identifying the remote radio unit by comparing a detected gain change pattern of the received signal having the gain changed by changing means with information about dedicated gain change patterns of the plurality of remote radio units.

23. A remote radio unit according to claim 22, further configured to provide information about the dedicated gain change patterns of the remote radio units.

24. A communication system comprising a plurality of remote radio units communicating with a central unit and a pattern providing means for providing information about dedicated gain change patterns of the plurality of remote radio units, the system configured to:

receive from a station a signal by a remote radio unit of a plurality of remote radio units;

change a gain of at least one remote radio unit according to a dedicated gain change pattern of said at least one remote radio unit;

detect a gain change pattern for the received signal; and identify the remote radio unit by comparing the detected gain change pattern with information about dedicated gain change patterns of the plurality of remote radio units provided by the pattern providing means.

* * * * *